Aug. 15, 1961    R. G. BRYSON    2,996,132
TESTING APPARATUS

Filed June 24, 1957    3 Sheets-Sheet 1

INVENTOR.
ROBERT G. BRYSON
BY *Alfred W. Petcheft*
ATTORNEY

INVENTOR.
ROBERT G. BRYSON
BY Alfred W. Petchaft
ATTORNEY

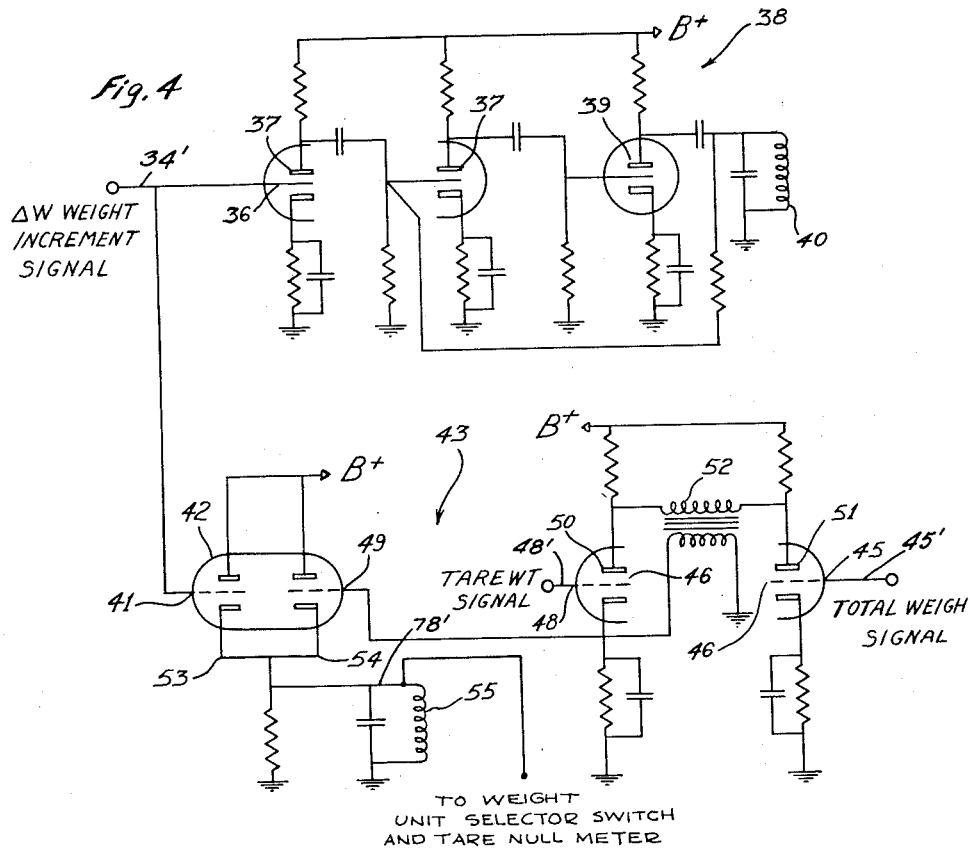

United States Patent Office 2,996,132
Patented Aug. 15, 1961

2,996,132
TESTING APPARATUS
Robert G. Bryson, Creve Coeur, Mo.
(132 Hawthorne Ave., Los Altos, Calif.)
Filed June 24, 1957, Ser. No. 667,518
11 Claims. (Cl. 177—3)

This invention relates in general to testing and, more particularly, to apparatus for determining the rate of flow of a liquid with respect to the total weight thereof.

There are a number of industrial processes wherein periodic sampling of reaction products is required so as to establish a ratio between the rate of change in weight of the reaction product with respect to weight thereof. One such process is in the manufacture of viscose, wherein the liquid viscose material is ultimately fed into spinerettes to make various grades of yarn. It is well known that some grades of viscose are suitable for one product, while other grades must be used for other types of yarn. For example, the grade of viscose suitable for making hosiery yarn is not satisfactory for making tire cord fabric. However, even though several successive batches of viscose are made under carefully controlled conditions which are as nearly identical as possible, the grade of viscose will vary from batch to batch and it is, therefore, necessary to test each finished batch of viscose to determine what grade has been produced so as to allocate it to the particular end-use for which it is best suited.

The test which has been used involves passing a sample of the batch of viscose through a filter under a predetermined pressure. The filtrate runs out rather freely at first, but gradually, as the filter plugs up, the rate of delivery of filtrate slows down. In carrying out such test, a laboratory technician places a weighing balance beneath the discharge pipe of the filter and places a glass beaker on the scale-pan of the balance. The tare weight of the beaker is balanced out and the filtrate discharged into the beaker. At regular intervals, the technician balances the scale and records the accumulated weight of filtrate during the interval as well as the total weight of filtrate discharged. A graph is made of the increment of weight against total weight and the resultant curve represents the rate of flow of filtrate with respect to total weight. This will vary during the filtration process, but from the graph it is possible to determine what type of viscose has been produced and, therefore, what type of yarn should be spun from it.

The aforementioned testing procedure is essentially manual and necessitates the utilization of a skilled technician. Furthermore, many viscose plants will have several batches of viscose being produced simultaneously and, therefore, all such batches must be continuously monitored at the same time.

It is, therefore, one of the objects of the present invention to provide an apparatus for automatically graphically recording the rate of flow of a material as a function of its weight.

It is also an object of the present invention to provide apparatus of the type stated which is capable of simultaneously monitoring a plurality of samples of the reaction product.

It is an additional object of the present invention to provide apparatus of the type stated which is highly accurate and requires a minimum of attention on the part of the technician.

With the above and other objects in view, my invention resides in the novel features of form, construction, arrangement, and combination of parts presently described and pointed out in the claims.

In the accompanying drawings—

FIG. 4 is a schematic diagram of the mixer amplifier forming part of the present invention;

FIG. 5 is a diagrammatic view of the multiple cam timer forming part of the present invention; and FIG. 6 is a graphical representation showing the sequence of operation of the cams in FIG. 5.

Figure 1:
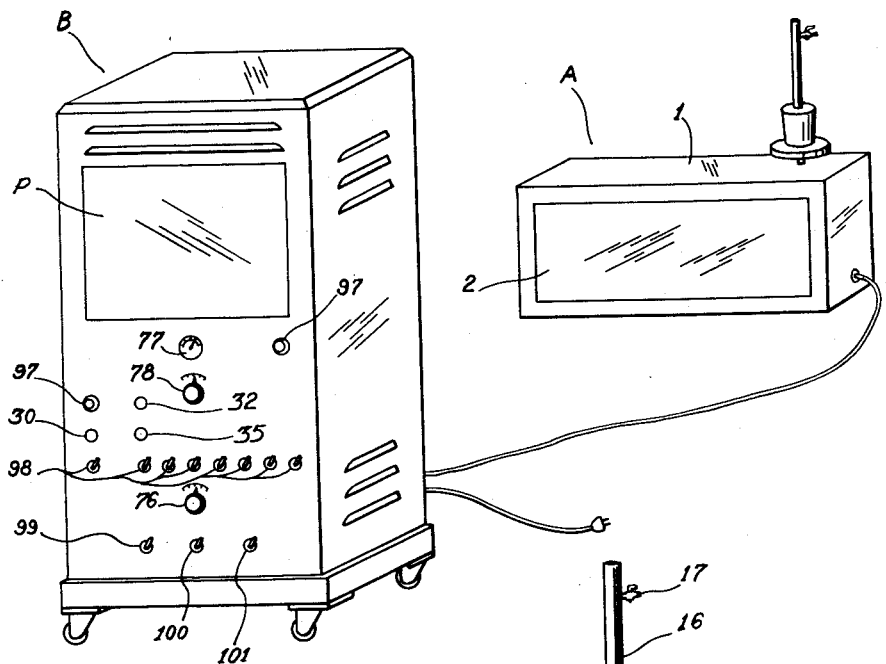
FIG. 1 is a perspective view of a weighing and recording apparatus constructed in accordance with and embodying the present invention.
Figure 2:
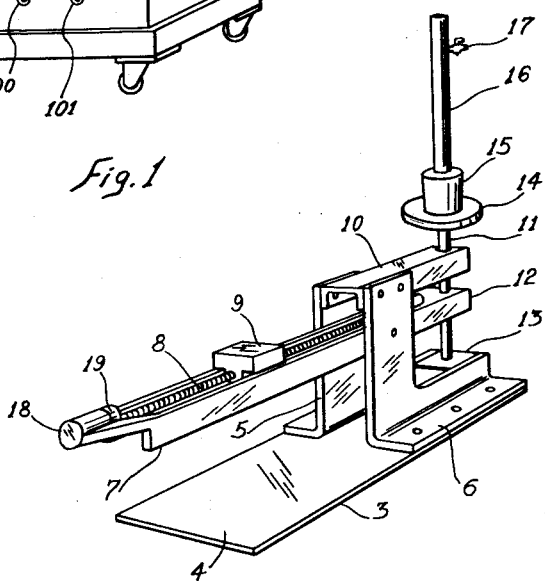
FIG. 2 is a fragmentary perspective view of the weighing unit forming part of the present invention.

Broadly speaking, the present invention resides in the provision of a series of weighing units, each electrically connected to a recorder through a stepping switch by which electrical impulses from the weighing units can be selectively fed into the recorder. Each weighing unit consists of a balance beam, a shiftable poise driven by a servo-motor system, and a load cell which generates current proportional to the weight increment of filtrate. The weighing unit also generates a total weight signal and the incremental weight signal and total weight signal are fed through a mixer-amplifier and into a controller and recording unit which actuates a recording stylus so as to produce a series of points on a stationary plotting paper which can be joined to produce a graph of incremental weight as a function of total weight.

Referring now in more detail and by reference characters to the drawings, which illustrate a preferred embodiment of the present invention, A designates an individual weighing unit suitably housed within a box-like housing 1 having a transparent plastic window 2. Positioned within the housing 1 is balance 3 provided with a base plate 4 having bolted thereto a pair of upstanding channels 5, 6, the latter rockably supporting therebetween a balance arm 7. Rotatably mounted on the balance beam 7 is a lead screw 8 having threaded thereon a shiftable poise 9. Rigidly secured between the channels 5, 6, in upwardly spaced relation to the beam 7 is a horizontal channel member 10, one end of which slidably supports a vertical rod 11, which bears against the end 12 of the beam 7, and at its lower end bears against a transducer or load cell 13. At its upper end, the rod 11 is provided with a scale-pan 14 for supporting a beaker 15 which receives the filtrate through a discharge pipe 16 provided with a suitable shut-off valve 17. Mounted on the forward end of the beam 7 is a two-phase servo-motor 18 which is drivingly connected to the lead screw 8 through a series of reduction gears 19 and at its other end the lead screw 8 is drivingly connected through reduction gears 20 to a potentiometer 21, the resistance of which varies linearly with respect to the angular displacement of the lead screw 8.

Provided for supplying current to the load cell 13 and potentiometer 21 is an audio-mixer transformer 22, one secondary winding 23 of which is connected through a voltage adjustment potentiometer 24 to one terminal 25 of the load cell 13. The load cell 13 is connected to an input transformer 26 of a servo-amplifier 27, the latter being adapted to drive the servo-motor 18. Connected across the winding 23 is a bias adjustment potentiometer 28 for fixed biasing of the servo-motor 18 for purposes presently more fully appearing. An additional secondary winding 29 supplies current to the potentiometer 21 through a weight calibration potentiometer 30, and, similarly, the winding 29 supplies current through a resistor 31 to a tare weight null potentiometer 32 by which the tare weight adjustment of the balance 3 can be made.

Connected across the output of the load cell 13 is a variable load resistor 33 and the output of the load cell 13 is controlled through a contact 34 and potentiometer 35, the contact 34 being connected through a conductor 34' to the grid 36 of a vacuum tube 37 in the first stage of a weight increment signal amplifier 38. The weight increment signal amplifier 38 is generally conventional and includes a voltage amplifier employing the dual triode tube 37 (type 12AX7) which is resistance-capacitance coupled to the output tube 39 (type 6C4) which drives the Y-axis input coil 40, for purposes presently more fully appearing. Furthermore, the weight increment signal is also applied to the grid 41 of an output tube 42 (type 12AU7) of a mixer amplifier 43. The total weight signal is controlled by the position of the variable contact 44 of the potentiometer 21 so as to apply the total weight signal to one grid 45 of a dual triode mixer tube 46 (type 12AX7), the grid 45 being connected to the contact 44 by a conductor 45'. Thus, the contact 44 comprises a movable means which is responsive to total weight in the beaker 15, as will be presently more fully appearing. The tare weight signal is controlled by a variable contact 47 which is connected and applies the tare weight signal to the other grid 48 of the dual troide 46 through a conductor 48'. The other grid 49 of the tube 42 is coupled to the plates 50, 51, of the tube 48 through a transformer 52, and the cathodes 53, 54, of the tube 42, in addition to being connected to ground by a conventional biasing resistor, are also connected to one terminal of the X-axis input coil 55, the other terminal which is grounded, for purposes presently more fully appearing. It will be apparent that the amplifiers 38, 43, permit mixing of the weight and tare weight signals differentially and also provide a signal to the X-axis coil 55 which will be a function of the weight, while the input to the Y-axis coil 40 will represent the incremental weight.

Provided for co-operation with the weighing unit A is a controlling and recording unit B which suitably houses a plotting mechanism 56 of the type shown in U.S. Patents Nos. 2,655,426 and 2,721,109. The plotting unit 56 includes input coils 40, 55, which are transformer coupled to a Y-axis amplifier 57 and an X-axis amplifier 58, respectively. The amplifiers 57, 58, drive pen motors 59, 60, which are movable along the Y and X axes, respectively, in direct linear proportion to the signals fed into the coils 40, 55. Provided for supplying excitation voltage to the feed-back potentiometers 61, 62, is an audio-mixer transformer 63, similar to the transformer 22 previously described, the feed-back potentiometers 61, 62, in turn, control the voltage to the coils 40, 55, respectively. Operatively connected to the motors 59, 60, is a recording stylus 64 suitably actuated by a solenoid 65. The recording stylus 64 is in the form of a multiple point printer wheel having, in the present example, eight numbers associated therewith. The printer wheel is capable of rotation and operates by means of a lever and ratchet. The stylus will, of course, imprint on a suitable piece of stationary plotting paper p which is visible to the front of the controlling and recording unit B. Appropriate Y and X axis zero-adjustments 66, 67, are provided for initial positioning of the point 64 and Y and X span adjustments 68, 69, are provided for regulating the effective operating span along the Y and X axes, respectively. Since the precise details of construction of the plotting mechanism, in and of themselves, form no part of the present invention, they are not shown or described in greater detail.

Provided within the controlling and recording unit B is a stepping switch 70 provided with a release coil 71 and having three groups of contacts 72, 73, 74, whereby the weighing and measuring unit A can be operatively connected to the plotting mechanism 56. As seen by reference to FIG. 3, each contact in the group 72 can be connected to the weight signal output of the mixer-amplifier 43 so as to apply voltage to the input coil 55, and, similarly, each contact in the group 73 can be connected to the incremental weight signal from the amplifier 38 so as to apply voltage to the Y-axis coil 40. The contacts in the group 74 are connected to a series of terminals 75 of a cyclic selector switch 76 which, in turn, is connected to the release coil 71. Mounted on the unit B is a tare weight null meter 77 for measuring the null weight signal and the meter 77 is operatively connected through a weight unit selector switch 78 to a weight signal output conductor 78' which is, in turn, operatively connected through the switch 98 to the cathodes 53, 54. The conductor 78' is also connected through the switch 99 to the coil 55.

Provided for operation of the units A and B in timed relation is a multiple cam timer assembly 79 including a driving motor 80 and four cams 81, 82, 83, 84, each being provided with followers 85, 86, 87, 88, which open and close switches 85', 86', 87', 88'. The switch 85' actuates the stepping switch 70, while the switch 86' is connected through the first terminal 89 of the group of contacts 74 so as to actuate the relay 90 and open the switch 91, thereby opening the circuit in the fixed phase winding 92 of the servo-motor 18. The switch 87' actuates the printer solenoid 65, while the switch 88' acts to open and close the incremental weight signal circuit. Interposed in the circuit of the printer solenoid 65 is a relay 93 which opens a switch 94 when the stepping switch 70 is in the "off" position. Power for the stepping switch 70, printer solenoid 65, and relays 90, 93, is supplied by a suitable D.C. power supply 95, and power for the transformers 22, 63, is supplied through a constant current power transformer 96 connected to a 115 volt, 60 cycle line. Connected across the stepping switch 70 is a manual push button 97. A measuring unit switch 98, the recorder on-off switch 99, the timer drive-motor on-off switch 100, and the main power switch 101 are all mounted, as shown in FIG. 1, on the front panel of the recorder B.

Figure 3:
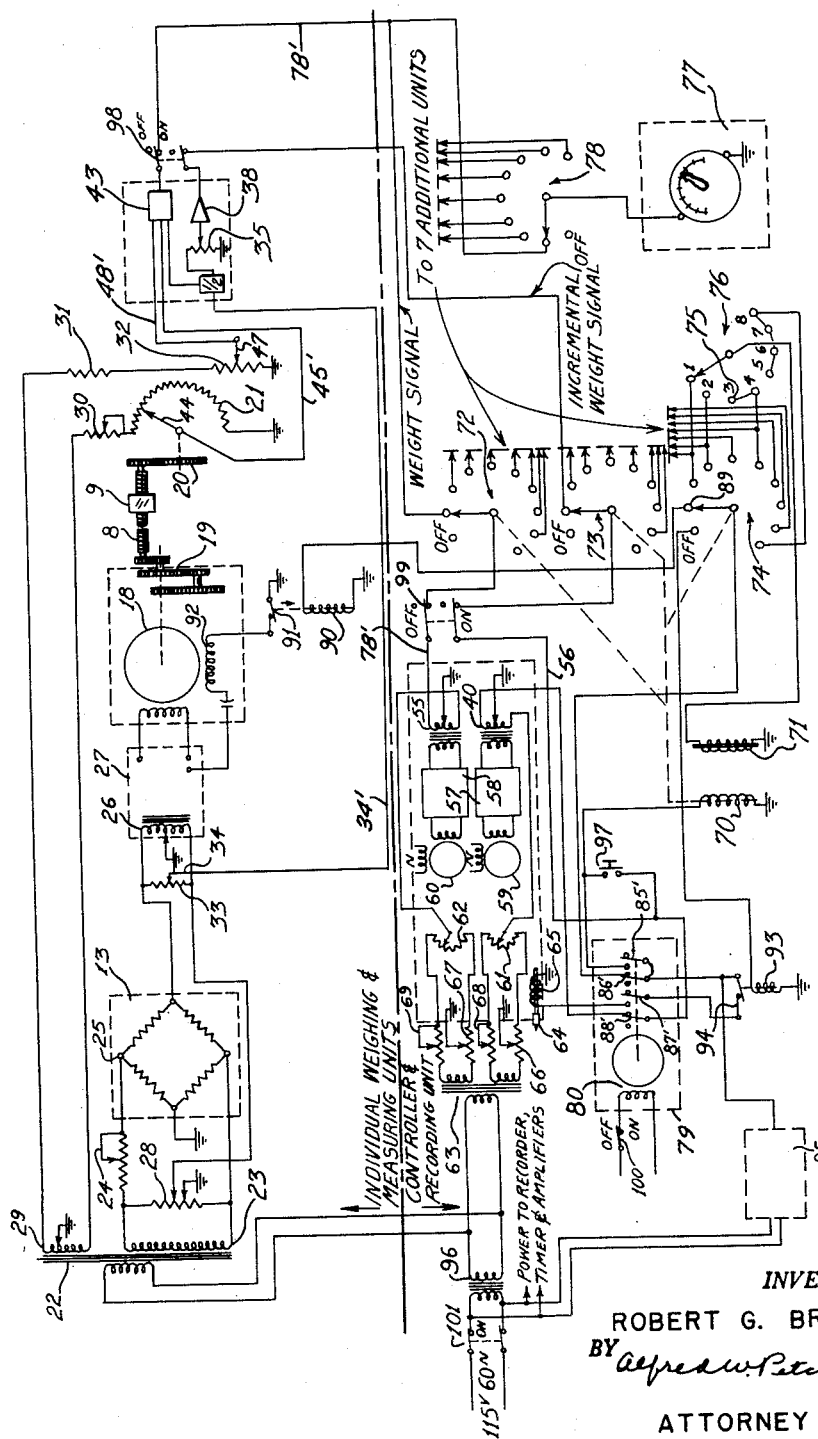
FIG. 3 is a schematic diagram of the entire apparatus.

In use, the valve 17 is opened and the filtrate discharged through the pipe 16 and into the beaker 15. Simultaneously the timer switch 100 is turned on so as to operate the cams 81, 82, 83, 84, in the timed sequence shown in FIG. 6. The stepping switch 70 is actuated by the switch 85' momentarily so as to cause the groups of contact 72, 73, 74, to move to the first position, such as shown in FIG. 3. The weight signal circuit applied to the coil 55 will then be closed. At this stage of the cycle the following situation ensues: The filtrate which is discharged into beaker 15 causes the scale pan 14 to drop down and, hence, the load cell 13 to generate a current which is fed through the servo-motor 18. The servo-motor 18 shifts the poise 9 through the lead screw 8 until the balance is restored to equilibrium within the precision of the servo-motor 18. This follow-up action of the servo-motor 18 has relieved the poise 9 on the load cell 13 and, hence, negligible current is generated by the latter. Momentarily thereafter, the switch 88' will close the circuit in the incremental weight scale so as to apply voltage to coil 40. At the same time the switch 86' causes the relay 90 to open the switch 91, thereby opening the fixed phase winding 92 of the servo-motor 18, thereby causing a cessation of rotation of the servo-motor 18. Hence, the follow-up action of the servo-motor 18 ceases and the filtrate which accumulates in the beaker 15 subsequently causes the load cell 13 to generate a current. The current generated by the load cell 13 will be directly proportional to the amount of out of balance of the beam 7, that is, the increment of weight accumulated during the extent of the precise timing interval as determined by the sequential closing of cam switches 86' and 87', the operation of cam switch 87' being presently more fully described. Thus, the load cell 13 comprises a means which is responsive to the accumulated weight of filtrate during the timing interval. This current, along with the weight signal transmitted from the potentiometer 21 and the tare weight null potentiometer 32 will drive the recorder 56. The bias adjustment potentiometer 28 is set so that any weight of filtrate in the beaker 15 less than a predetermined small value will cause reverse rotation of the servo-motor 18. Hence, this predetermined weight is required to null out the bias, but since the tare weight nulling potentiometer 32 nulls out this weight along with the tare weight, the weight calibration is not affected. Such arrangement permits the rod 11 to always bear compression-wise against the load cell 13.

Approaching the end of the cycle, the switch 87′ actuates the printer solenoid 65 so as to cause the stylus 64 to imprint a dot and the numeral "1" on the plotting paper p. In the use of the apparatus herein for measuring filtrate in the viscose process, it has been found that a total cycle is about 16.5 seconds with the time required to actuate the stepping switch 70 and printer solenoid 65, each being of the order of 0.5 second. This leaves a 1.0 second delay and a 14.5 second time interval in which the incremental weight signal is recorded. As the first cycle is completed, the stepping switch 70 is normally again actuated by the switch 85′ so as to repeat the process with the next succeeding weighing and measuring unit A. However, the cycle selector switch 76 determines the number of cycles and is set in accordance with the number of individual weighing and measuring units A used. For example, if two units A are to be operated, the cycle selector switch 76 is set to the "2" position, in which case, as the contactor of the stepping switch 70 moves to the third position in the group of contacts 74, the cycle selector switch 76 will close the circuit in the release coil 71, causing the stepping switch 70 to move to the "off" position. While in such "off" position, the relay 93 is activated, thereby opening the circuit operating the printer solenoid 65. While the controller and recorder unit B is illustrated as being capable of use with eight weighing units A, it should be understood that a lesser or greater number of weighing units A may be used. The push button 97 may, if desired, be actuated to advance the stepping switch 70 to select a desired weighing and measuring unit A for operation with the controller and recorder unit B.

As a series of samples are made from each weighing and measuring unit A, the dots imprinted on the plotting paper 66 by the stylus 64 will be recorded with a number. Thus, all of the dots marked with the numeral "1" will correspond to one of the individual weighing and measuring units A so that the curve representing the rate of change of weight with respect to weight for each batch of viscose filtrate can be determined by simply connecting the various dots having corresponding numerals.

It should be understood that changes and modifications in the form, construction, arrangement, and combination of the several parts of the testing apparatus may be made and substituted for those herein shown and described without departing from the nature and principle of my invention.

Having thus described my invention, what I claim and desire to secure by Letters Patent is:

1. A device of the character described comprising a beam rockably mounted on a fulcrum, a poise slidably mounted on said beam, a container mounted on said beam on the opposite side of said fulcrum from said poise, means for supplying said container with a varying quantity of a sample of material, transducer means operatively connected to said container for converting the difference between the weight of the material in said container and the weight represented by the position of said poise on said beam into a first electrical signal, servo-driven means operatively connected to said poise and said transducer means for urging said poise along said beam whereby to strike a condition of balance about said fulcrum, means for measuring the position of said poise on said beam whereby to obtain an indication of the weight of material in said container and for converting said indication into a second electrical signal, and cycling means for periodically disabling said servo-driven means for a predetermined interval whereupon the intensity of said first electrical signal increases according to the rate at which material is added to said container and for thereupon supplying said first and second electrical signals to a recording means whereby to obtain indications of rate of change of weight versus total weight for the material being sampled, said cycling means also being provided with restoration means for placing said servo-driven means back in operation for a second predetermined interval whereupon a new condition of balance between said poise and the material in said container may be obtained, said disabling means and restoration means being alternately operable throughout a predetermined period.

2. A device of the character described comprising a beam rockably mounted on a fulcrum, a poise slidably mounted on said beam, a container mounted on said beam on the opposite side of said fulcrum from said poise, filtering means operatively connected to said container for continuously filtering a sample of material into said container, transducer means operatively connected to said container for converting the difference between the weight of the material in said container and the weight represented by the position of said poise on said beam into a first electrical signal, servo-driven means operatively connected to said poise and said transducer means for urging said poise along said beam whereby to strike a condition of balance about said fulcrum, means for measuring the position of said poise on said beam whereby to obtain an indication of the weight of material in said container and for converting said indication into a second electrical signal, and cycling means for periodically disabling said servo-driven means for a predetermined interval whereupon the intensity of said first electrical signal increases according to the rate at which material is added to said container and for thereupon supplying said first and second electrical signals to a recording means whereby to obtain indications of rate of change of weight versus total weight for the material being sampled, said cycling means also being provided with restoration means for placing said servo-driven means back in operation for a second predetermined interval whereupon a new condition of balance between said poise and the material in said container may be struck, said disabling means and restoration means being alternately operable throughout a predetermined period.

3. A device of the character described comprising a beam rockably mounted on a fulcrum, a poise slidably mounted on said beam, a container mounted on said beam on the opposite side of said fulcrum from said poise, filtering means operatively connected to said container for continuously filtering a sample of material into said container, transducer means for converting the difference between the weight of the material in said container and the weight represented by the position of said poise on said beam into a first electrical signal, said transducer means operatively abutting a rod-like member extending downwardly from said container and including a load cell fixedly mounted beneath said rod-like member, whereby when said poise and container are in a position of unbalance said rod-like member exerts a force on said load cell which is representative of the degree of unbalance and said load cell converts said force into said first electrical signal, servo-driven means operatively connected to said poise and said transducer means for urging said poise along said beam whereby to strike a condition of balance about said fulcrum, means for measuring the position of said poise on said beam whereby to obtain an indication of the weight of material in said container and for converting said indication into a second electrical signal, and cycling means for periodically disabling said servo-driven means for a predetermined interval whereupon the intensity of said first electrical signal increases according to the rate at which material is added to said container and for thereupon supplying said first and second electrical signals to a recording means whereby to obtain indications of rate of change of weight versus total weight for the material being sampled, said cycling means also being provided with restoration means for placing said servo-driven means back in operation for a second predetermined interval whereupon a new condition of balance between said poise and the material in said container may be struck, said disabling means and restoration means being alternately operable throughout a predetermined period.

4. A device of the character described comprising a beam rockably mounted on a fulcrum, a poise slidably mounted on said beam, a container mounted on said beam on the opposite side of said fulcrum from said poise, means for supplying said container with a varying quantity of a sample of material, transducer means operatively connected to said container for converting the difference between the weight of the material in said container and the weight represented by the position of said poise on said beam into a first electrical signal, a lead screw threadedly mounted in said poise for urging said poise along said beam, servo-motor means for turning said lead screw, servo-amplifying means operatively connected to said transducer means and to said motor means for amplifying said first electrical signal whereby to drive said motor means thereby urging said poise along said beam into a condition of balance with said container, means for measuring the position of said poise on said beam whereby to obtain an indication of the weight of material in said container and for converting said indication into a second electrical signal, and cycling means for periodically disabling said servo-driven means for a predetermined interval whereupon the intensity of said first electrical signal increases according to the rate at which material is added to said container and for thereupon supplying said first and second electrical signals to a recording means whereby to obtain indications of rate of change of weight versus total weight for the material being sampled, said cycling means also being provided with restoration means for placing said servo-driven means back in operation for a second predetermined interval whereupon a new condition of balance between said poise and the material in said container may be obtained, said disabling means and restoration means being alternately operable throughout a predetermined period.

5. A device of the character described comprising a beam rockably mounted on a fulcrum, a poise slidably mounted on said beam, a container mounted on said beam on the opposite side of said fulcrum from said poise, means for supplying said container with a varying quantity of a sample of material, transducer means operatively connected to said container for converting the difference between the weight of the material in said container and the weight represented by the position of said poise in said beam into a first electrical signal, a lead screw threadedly mounted in said poise for urging said poise along said beam, servo-motor means for turning said lead screw, servo-amplifying means operatively connected to said transducer means and to said motor means for amplifying said first electrical signal whereby to drive said motor means thereby urging said poise along said beam into a condition of balance with said container, a follow-up potentiometer having a slidable arm operatively connected to said lead screw and adopted to move therewith, thereby changing the resistance between said slidable arm and one end of said potentiometer as said poise moves on said beam whereby to obtain a measurable indication of the weight of the material in said container, and cycling means for periodically disabling said servo-driven means for a predetermined interval whereupon the intensity of said first electrical signal increases according to the rate at which material is added to said container and for thereupon supplying said first and second electrical signals to a recording means whereby to obtain indications of rate of change of weight versus total weight for the material being sampled, said cycling means also being provided with restoration means for placing said servo-driven means back in operation for a second predetermined interval whereupon a new condition of balance between said poise and the material in said container may be obtained, said disabling means and restoration means being alternately operable throughout a predetermined period.

6. A device of the character described comprising a beam rockably mounted on a fulcrum, a poise slidably mounted on said beam, a container mounted on said beam on the opposite side of said fulcrum from said poise, means for supplying said container with a varying quantity of a sample of material, transducer means for converting the difference between the weight of the material in said container and the weight represented by the position of said poise on said beam into a first electrical signal, said transducer means operatively abutting a rod-like member extending downwardly from said container and including a load cell fixedly mounted beneath said rod-like member, whereby when said poise and container are in a position of unbalance said rod-like member exerts a force on said load cell which is representative of the degree of unbalance and said load cell converts said force into said first electrical signal, a lead screw threadedly mounted in said poise for urging said poise along said beam, servo-motor means for turning said lead screw, servo-amplifying means operatively connected to said transducer means and to said motor means for amplifying said first electrical signal whereby to drive said motor means thereby urging said poise along said beam into a condition of balance with said container, a follow-up potentiometer having a slidable arm operatively connected to said lead-screw and adopted to move therewith, thereby changing the resistance between said slidable arm and one end of said potentiometer as said poise moves on said beam whereby to obtain a measurable indication of the weight of the material in said container, and cycling means for periodically disabling said servo-driven means for a predetermined interval whereupon the intensity of said first electrical signal increases according to the rate at which material is added to said container and for thereupon supplying said first and second electrical signals to a recording means whereby to obtain indications of rate of change of weight versus total weight for the material being sampled, said cycling means also being provided with restoration means for placing said servo-driven means back in operation for a second predetermined interval whereupon a new condition of balance between said poise and the material in said container may be obtained, said disabling means and restoration means being alternately operable throughout a predetermined period.

7. A device of the character described comprising a beam rockably mounted on a fulcrum, a poise slidably mounted on said beam, a container mounted on said beam on the opposite side of said fulcrum from said poise, means for supplying said container with a varying quantity of a sample of material, transducer means operatively connected to said container for converting the difference between the weight of the material in said container and the weight represented by the position of said poise on said beam into a first electrical signal, servo-driven means operatively connected to said poise and said transducer means for urging said poise along said beam whereby to strike a conditions of balance about said furcrum, means for measuring the position of said poise on said beam whereby to obtain an indication of the weight of material in said container and for converting said indication into a second electrical signal, tare weight biasing means for subtracting a signal equivalent to the weight of said container from said second electrical signal whereby to obtain a third electrical signal which is representative of the weight of material in said container, and cycling means for periodically disabling said servo-driven means for a predetermined interval whereupon the intensity of said first electrical signal increases according to the rate at which material is added to said container and for thereupon supplying said first and third electrical signals to a recording means whereby to obtain indications of rate of change of weight versus total weight for the material being sampled, said cycling means also being provided with restoration means for placing said servo-driven means back in operation for a second predetermined interval whereupon a new condition of balance between said poise and the material in said container may be obtained, said disabling means and restoration means being alternately operable throughout a predetermined period.

8. A device of the character described comprising a beam rockably mounted on a fulcrum, a poise slidably mounted on said beam, a container mounted on said beam on the opposite side of said fulcrum from said poise, means for supplying said container with a varying quantity of a sample of material, transducer means operatively connected to said container for converting the difference between the weight of the material in said container and the weight represented by the position of said poise on said beam into a first electrical signal, servo-driven means operatively connected to said poise and said transducer means for urging said poise along said beam whereby to strike a condition of balance about said fulcrum, means for measuring the position of said poise on said beam whereby to obtain an indication of the weight of material in said container and for converting said indication into a second electrical signal, and continuously cycling cam means for periodically disabling said servo-driven means for a predetermined interval whereupon the intensity of said first electrical signal increases according to the rate at which material is added to said container and for thereupon supplying said first and second electrical signals to a recording means whereby to obtain indications of rate of change of weight versus total weight for the material being sampled, said cycling means also being provided with restoration means for placing said servo-driven means back in operation for a new condition of balance between said poise and the material in said container may be obtained, said disabling means and restoration means being alternately operable throughout a predetermined period.

9. A device of the character described comprising a beam rockably mounted in a fulcrum, a poise slidably mounted on said beam, a container mounted on said beam on the opposite side of said fulcrum from said poise, means for supplying said container with a varying quantity of a sample of material, a rod rigidly connected to and extending downwardly from said container, a transducer located beneath said rod, said rod and transducer being located so that when said beam is in balance said rod exerts a force on said transducer equal to the tare weight of said container, a current source operatively connected to said transducer, a servo-amplifier operatively connected across said transducer, a servo-motor operatively connected to said servo-amplifier and provided with means for urging said poise along said beam, a follow-up potentiometer operatively connected to said urging means for providing a resistive indication of the position of said poise on said beam, an amplifier provided with two independent channels, the input to said first channel being connected to the output of said transducer, the input of said second channel being connected to said follow-up potentiometer, a recording means having the outputs of said amplifier connected thereto, means for periodically disabling said servo-motor for predetermined intervals of time whereupon said material will collect in said container causing said rod to exert a force on said transducer, said transducer thereupon converting that force into an electrical signal which is supplied to said recording means through the first channel of said amplifier, means for recording the magnitude of said electrical signal after said predetermined interval of time, and means for re-enabling said servo-motor for a period sufficient to rebalance said beam.

10. A device of the character described comprising a beam rockably mounted on a fulcrum, a poise slidably mounted on said beam, a container mounted on said beam on the opposite side of said fulcrum from said poise, means for supplying said container with a varying quantity of sample of material, a rod rigidly connected to and extending downwardly from said container, a transducer located beneath said rod, said rod and transducer being located so that when said beam is in balance said rod exerts a force on said transducer equal to the tare weight of said container, a current source operatively connected to said transducer, a servo-amplifier operatively connected across said transducer, a servo-motor operatively connected to said servo-amplifier and provided with means for urging said poise along said beam, a follow-up potentiometer operatively connected to said urging means for providing a resistive indication of the position of said poise on said beam, an amplifier provided with two independent channels, the input to said first channel being connected to the output of said transducer, the input of said second channel being connected to said follow-up potentiometer, a recording means having the outputs of said amplifier connected thereto, means for subtracting said tare weight of said container from the output of said second channel, means for periodically disabling said servo-motor for predetermined intervals of time whereupon said material will collect in said container causing said rod to exert a force on said transducer, said transducer thereupon converting that force into an electrical signal which is supplied to said recording means through the first channel of said amplifier, means for recording the magnitude of said electrical signal after said predetermined interval of time, and means for re-enabling said servo-motor for a period sufficient to rebalance said beam.

11. A device of the character described comprising a beam rockably mounted on a fulcrum, poise slidably mounted on said beam, a container mounted on said beam on the opposite side of said fulcrum from said poise, means for supplying said container with a varying quantity of a sample of material, a rod rigidly connected to and extending downwardly from said container, a transducer located beneath said rod, said rod and transducer being located so that when said beam is in balance said rod exerts a force on said transducer equal to the tare weight of said container, a current source of operatively connected to said transducer, a servo-amplifier operatively connected across said transducer, a servo-motor operatively connected to said servo-amplifier and provided with means for urging said poise along said beam, a follow-up potentiometer operatively connected to said urging means for providing a resistive indication of the position of said poise on said beam, an amplifier provided with two independent channels, the input to said first channel being connected to the output of said transducer, the input of said second channel being connected to said follow-up potentiometer, a recording means having X-axis and Y-axis recording channels, the output of said first amplifier channel being operatively connected to said Y-axis channel to the output of said second amplifier channel being operatively connected to said X-axis channel whereby to obtain a planar recording total weight versus increment of weight acting upon said transducer, means for subtracting said tare weight of said container from the output of said second channel, means for periodically disabling said servo-motor for predetermined intervals of time whereupon said material will collect in said container causing said rod to exert a force on said transducer, said transducer thereupon converting that force into an electrical signal which is supplied to said recording means through the first channel of said amplifier, means for recording the magnitude of said electrical signal after said predetermined interval of time, and means for re-enabling said servo-motor for a period sufficient to rebalance said beam.

References Cited in the file of this patent

UNITED STATES PATENTS

| | | |
|---|---|---|
| 1,909,724 | Schellentrager | May 16, 1933 |
| 1,952,171 | Jones | Mar. 27, 1934 |
| 2,505,237 | Dwyer | Apr. 25, 1950 |
| 2,541,915 | Culver | Feb. 13, 1951 |
| 2,597,899 | Payne | May 27, 1952 |
| 2,610,843 | Schallentrager | Sept. 16, 1952 |
| 2,688,477 | Lindards | Sept. 7, 1954 |
| 2,746,708 | Gilchrist | May 22, 1956 |
| 2,766,981 | Lauler et al. | Oct. 16, 1956 |
| 2,825,893 | Schechter | Mar. 4, 1958 |
| 2,826,068 | Sperry | Mar. 11, 1958 |